United States Patent
Satasia et al.

(10) Patent No.: US 10,521,532 B1
(45) Date of Patent: Dec. 31, 2019

(54) SEGMENTED MEMORY INSTANCES

(71) Applicant: Arm Limited, Cambridge (GB)

(72) Inventors: Pratik Ghanshambhai Satasia, Cedar Park, TX (US); Yew Keong Chong, Austin, TX (US); Sriram Thyagarajan, Austin, TX (US); Hongwei Zhu, San Jose, CA (US); Mouli Rajaram Chollangi, Fremont, CA (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/125,158

(22) Filed: Sep. 7, 2018

(51) Int. Cl.
*G06F 17/50* (2006.01)
*G06F 17/40* (2006.01)

(52) U.S. Cl.
CPC .......... *G06F 17/5031* (2013.01); *G06F 17/40* (2013.01); *G06F 17/505* (2013.01)

(58) Field of Classification Search
CPC ..... G06F 17/5031; G06F 17/40; G06F 17/505
USPC ......................................................... 716/103
See application file for complete search history.

(56) References Cited

U.S. PATENT DOCUMENTS

| | | | | |
|---|---|---|---|---|
| 6,249,901 B1* | 6/2001 | Yuan | ................... | G06F 17/5022 716/103 |
| 9,087,036 B1* | 7/2015 | Chou | ................... | G06F 11/261 |
| 9,542,512 B1* | 1/2017 | Al-Hawari | .......... | G06F 17/5022 |
| 2004/0215437 A1* | 10/2004 | Sul | ....................... | G06F 17/5036 703/19 |
| 2005/0060500 A1* | 3/2005 | Luo | ........................ | G06F 13/28 711/147 |
| 2006/0052996 A1* | 3/2006 | Chen | ................... | G06F 17/5036 703/18 |
| 2006/0282233 A1* | 12/2006 | Pasricha | ............. | G06F 17/5022 703/1 |
| 2016/0246911 A1* | 8/2016 | Subramaniam | ..... | G06F 17/5068 |
| 2018/0173822 A1* | 6/2018 | Zhu | ....................... | G06F 17/5009 |
| 2018/0173834 A1* | 6/2018 | Chollangi | ........... | G06F 17/5036 |

* cited by examiner

*Primary Examiner* — Suresh Memula
(74) *Attorney, Agent, or Firm* — Pramudji Law Group PLLC; Ari Pramudji

(57) ABSTRACT

Various implementations described herein refer to a method. The method may include selecting a target memory instance to characterize for timing file generation, determining a number of segments for the target memory instance based on user defined accuracy, and partitioning the target memory instance into the number of segments based on a physical architecture of the target memory instance. The method may also include generating test-bench data based on the number of segments and simulating the test-bench data, obtaining simulation data for the target memory instance associated with each segment in the number of segments, and generating a timing file by reporting timing data for each segment in the number of segments.

20 Claims, 6 Drawing Sheets

SEGMENTED MEMORY INSTANCES

BACKGROUND

This section is intended to provide information relevant to understanding various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

Liberty (.lib) files gather data used by electronic design automation (EDA) tools to perform static timing analysis (STA) and power analysis of circuit blocks. Typically, for each variation in parameters settings, a liberty (.lib) file is generated. Unfortunately, this process can use significant amounts of computing resources and time.

Conventionally, to model timing of a multi-bit bus, timing for each bit of the bus is characterized, and a worst case timing model of the whole bus is reported in a liberty file. With advanced technology nodes, conventional methods introduce unnecessary and unacceptable pessimism in timing models. Some conventional methods report the timing model for each bit of the bus. This method introduces problems by dramatically increasing complexity, timing-database size and liberty model size, and by significantly increasing cost of model generation and verification. Also, these conventional methods do not apply to memory compiler. For instance, if timing is modeled for each bit of the bus, it can be difficult to determine which data should be used for calculation because some memory instances can have a different number of bits than characterized instances.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein relate to accurate segment based memory instances and compiler characterization. For instance, various schemes and techniques described herein are directed to generating a timing model (e.g., liberty timing model) of a user defined memory instance based on flexible bus segmentation and interpolation of a set of memory instances that have been characterized. The schemes and techniques described herein may significantly improve the setup and hold window for system-on-a-chip (SoC) timing closure which may result in significantly less hold-buffer insertion so as to reduce SoC area and power. As described herein, memory timing files (e.g., liberty timing files) may include critical information, such as timing, power, leakage and capacitance that may be used for SoC implementation. Therefore, various schemes and techniques described herein relate to the manner in which the data incorporated in the memory timing files is represented efficiently with acceptable accuracy loss.

As described herein, various schemes and techniques partition the bus into segments (sub-buses). The partition is based on physical architecture of the memory instances, and for the given bus, all of the memory instances have a fixed number of segments depending on architecture and accuracy. For different memory instances, the given segment may have a different number of bits. However, the given segment may have the same physical meaning for all of the memory instances, which means that data may be interpolated to generate a timing model (e.g., liberty timing file) of a corresponding segment for the memory instances that are not characterized. Since the given bus of each memory instance may have the same number of segments, interpolation is straight-forward. The number of segments are tuned based on the physical architecture of the memory and accuracy. For selected instances to be characterized, each bit of the segment is characterized, and the data is stored in a database as the timing data for the given instance and segment. Also, each segment in the new memory instance may then be modelled by interpolating the models of corresponding segments across the set of characterized memory instances.

Various implementations of a system and methods for generating timing files (such as, e.g., liberty timing files) will now be described in more detail herein with reference to FIGS. 1-6.

Figure 1:
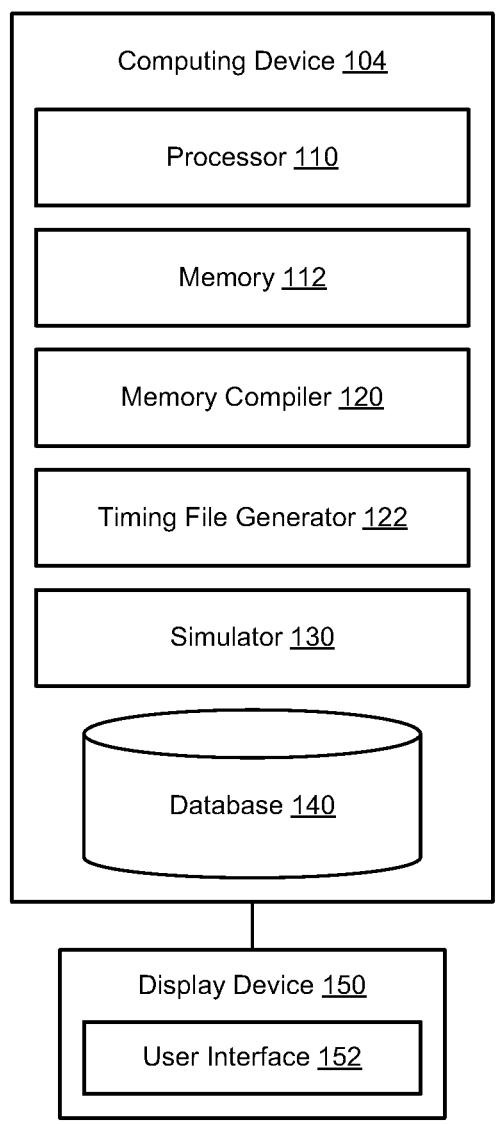
FIG. 1 illustrates a block diagram of a system for generating timing files (e.g., liberty timing files) in accordance with various implementations described herein.

FIG. 1 illustrates a block diagram of a system 100 for generating timing files (e.g., liberty timing files) in accordance with various implementations described herein.

Timing files, such as, e.g., liberty files (.lib files), may refer to timing data for an integrated circuit. In some instances, liberty files may be used to provide timing and power parameters associated with one or more cells of an integrated circuit. The timing and power parameters may be generated from simulating cells of an integrated circuit under various operating conditions, and the data associated therewith may be represented in a .lib file format. Liberty files may include timing models and associated data to determine (or calculate) various timing characteristics and/or parameters associated with an integrated circuit, such as, e.g., input/output (I/O) delay paths, timing check values, interconnect delays, etc.

In reference to FIG. 1, the system 100 may include a computer based system configured to generate liberty files. The system 100 may be associated with a computing device 104 implemented as a special purpose machine configured to generate liberty files, as described herein. In this instance, the computing device 104 may include any standard element(s) and/or component(s), including at least one processor(s) 110, memory 112 (e.g., non-transitory computer-readable storage medium), one or more database(s) 140, power, peripherals, and various other computing elements and/or components that may not be specifically shown in FIG. 1. The computing device 104 may include instructions stored on the non-transitory computer-readable medium 112 that are executable by the at least one processor 110. The computing device 104 may be associated with a display device 150 (e.g., a monitor or other display) that may be used to provide a user interface (UI) 152, such as, e.g., a graphical user interface (GUI). In some instances, the UI 152 may be used to receive various parameters and/or preferences from a user for managing, operating, and/or utilizing the computing device 104. As such, the computing device 104 may include the display device 150 for providing output to a user, and the display device 150 may include the UI 152 for receiving input from the user. For instance, the UI 152 may be implemented as a memory compiler user-interface. In some instances, the UI 152 may receive user input associated with user defined accuracy, and the user defined accuracy may be determined (or calculated) by direct user input.

In various implementations, the computing device 104 may be configured to implement a methodology for generating timing files (e.g., liberty timing files) for memory instances that are segmented based on user defined accuracy. For instance, liberty files (.lib files) may be used to gather data used by electronic design automation (EDA) tools to perform static timing analysis (STA) and power analysis of integrated circuits and circuit blocks. EDA model/view files, such as and not limited to liberty view or model/view files may have various abstract physical characteristics of memory, such as and not limited to performance, constraints, noise and/or power. For each cell included in a timing file, such as, e.g., a .lib file, and depending on its logic function, different data may be available, such as, e.g., one or more of input pin capacitance, propagation delay from input to output, output transition time, various timing constraints (e.g., hold/setup/min pulse width), current leakage power, and energy per transition. In some instances, circuit path delay may result from addition of delays of cells being part of this path, and circuit power may result from addition of power of cells being part of a circuit. The different data available in the .lib file may be a result from SPICE simulations (Simulation Program with Integrated Circuit Emphasis) performed at cell level. Running SPICE simulations for the cells included in the .lib file may use significant CPU time, and in some instances, a .lib file may be generated for one specific PVT (process, voltage and temperature) corner for one type of transistor (e.g., low-VT, high-VT, etc.). In some applications, designing an integrated circuit may use multiple .lib files to account for possible variations in process, voltage and temperature for different transistor types. Also, in some cases, the number of .lib files may be consequently multiplied.

In accordance with various implementations described herein, the computing device 104 may be configured to implement a methodology to generate a timing model (e.g., a liberty timing file) of a new memory instance based on bus segmentation and/or interpolation of a set of memory instances that have been characterized. The bus of each memory instance may be divided into a same number of segments, regardless of varying widths of the buses across different memory instances. This number of segments may be determined based on a specified user defined accuracy and/or internal RC delay obtained from extracted netlist. When characterizing memory instances, each memory instance may be characterized with different number of segments based on an accuracy requirement of each memory instance. When characterizing for the memory compiler 120, a wide instance may be used to determine a number of segments that are needed to meet the user defined accuracy requirement. For each bus, the segments may or may not include a same number of bits, and bits included in each segment may be determined based on a physical architecture of the memory instance. Within each memory instance, a worst-case timing among all of the bits in each segment may be used as a model of the segment. Each segment in the new instance may be modelled by interpolating models of corresponding segments across the set of characterized memory instances.

In reference to FIG. 1, the computing device 104 may include a memory compiler 120 configured to obtain user configuration parameters, retrieve EDA data (e.g., timing files, liberty timing files, etc.), and generate a memory instance. EDA model/view files (such as and not limited to liberty view or model/view files) may contain (or at least include) various abstract physical characteristics of memory, such as and not limited to performance, constraints, noise and/or power. Sometimes, the memory compiler 120 may generate millions of memories instances with different configurations, and in some cases, it may be costly to characterize every instance and every bit of the bus in a memory instance. Thus, the memory compiler 120 may use an efficient methodology that involves selecting a set of instances which cover a whole design space of the memory compiler 120. Given words, bits, and various other configurations, the memory compiler 120 may assemble a physical circuit for a selected memory instance. Also, the memory compiler 120 may generate various circuit behavioral data, such as, e.g., leakage, timing, power and noise characteristics, for the selected memory instance. The memory compiler 120 may generate many instances, and it may be difficult, inefficient and overwhelming for the memory compiler 120 to generate and store behavioral data for each and every memory instance. As such, implementations described herein refer to schemes and techniques to generate timing files (e.g., liberty timing files) for usage by the memory compiler 120 to thereby develop and produce more accurate and efficient data. Further, the schemes and techniques described herein are based on interpolating and curve-fitting segment data for a user selected memory instance.

In some implementations, the memory compiler 120 may be used to access a library of memory building blocks for assembly, such as, e.g., blocks and tile-cells of bitcells, arrays, drivers, sense amplifiers, control circuits, decoders, multiplexers, etc. The memory compiler 120 may be configured to generate and tile various physical views to build memory instances. During design stages, the memory compiler 120 may interface with a user to receive user input parameters in reference to words, bits, multiplexing, and various other options. With the various input, the memory compiler 120 may build memory instances and EDA views for implementation and manufacture.

Various implementations described herein provide for an efficient methodology that involves carefully selecting a set of instances which cover the whole design space of the memory compiler. The timing model of selected instances may be characterized and saved in a database. When the memory compiler generates a timing model or file (e.g., a liberty timing model or file) for a given instance, and if the given instance is a characterized instance, the determined data may be used directly. If the given instance is not a characterized instance, the memory compiler may interpolate the determined data of a nearest characterized instance and uses the interpolated data to generate the timing model or file (e.g., liberty timing model or file).

In reference to FIG. 1, the computing device 104 may include a liberty file generator 122 configured to cause the at least one processor 110 to generate timing data for an integrated circuit. For instance, the liberty file generator 122 may be configured to cause the at least one processor 110 to perform or execute one or more of the following sequence of events. The liberty file generator 122 may select a memory instance to characterize for liberty file generation, and the memory instance may include a memory input and output bus width that is dependent on a size of the memory instance. The liberty file generator 122 may determine (or calculate) a number of segments for the memory input and output bus width based on user defined accuracy. The liberty file generator 122 may partition (or divide) the memory input and output bus width into the number of segments as determined based on a physical architecture of the memory instance. The liberty file generator 122 may generate test-bench data with a netlist based on the number of segments as determined and simulating the test-bench data with the netlist. The liberty file generator 122 may obtain (or collect) simulation data for the memory input and output bus width that is associated with each segment in the number of segments. The liberty file generator 122 may generate a timing file (e.g., liberty timing file) by reporting timing data for each segment in the number of segments. In some implementations, the liberty timing file may be used by electronic design automation (EDA) tools to perform static timing analysis (STA) and power analysis of the integrated circuit, and thus, the liberty timing file may be used by the computing device to manufacture, or cause to be manufactured, an integrated circuit based on the liberty timing file.

In reference to FIG. 1, the computing device 104 may include a simulator 130 configured to cause the at least one processor 110 to generate one or more simulations of the integrated circuit. In some instances, the simulator 130 may include a SPICE simulator configured to generate SPICE simulations of the integrated circuit. Generally, SPICE is an acronym for Simulation Program with Integrated Circuit Emphasis, which is an open source analog electronic circuit simulator. Further, SPICE is a general-purpose software program used by the semiconductor industry to check the integrity of integrated circuit designs and to predict the behavior of integrated circuit designs. As such, in some instances, the liberty file generator 122 may be configured to interface with the simulator 130 to generate timing data based on one or more simulations (e.g., SPICE simulations) of the integrated circuit for a range of variations of operating conditions including a range of process, voltage and temperature variations.

In some implementation, the computing device 104 may include one or more databases 140 configured to store and/or record various information related to generating liberty files. For instance, the database(s) 140 may be configured to store various data and information related to the integrated circuit and one or more of various timing data, timing files, liberty files (e.g., liberty timing files), and equation related data. Further, the database(s) 140 may be configured to store data and information related to the integrated circuit in reference to simulation data (including, e.g., SPICE simulation data).

Figure 2:
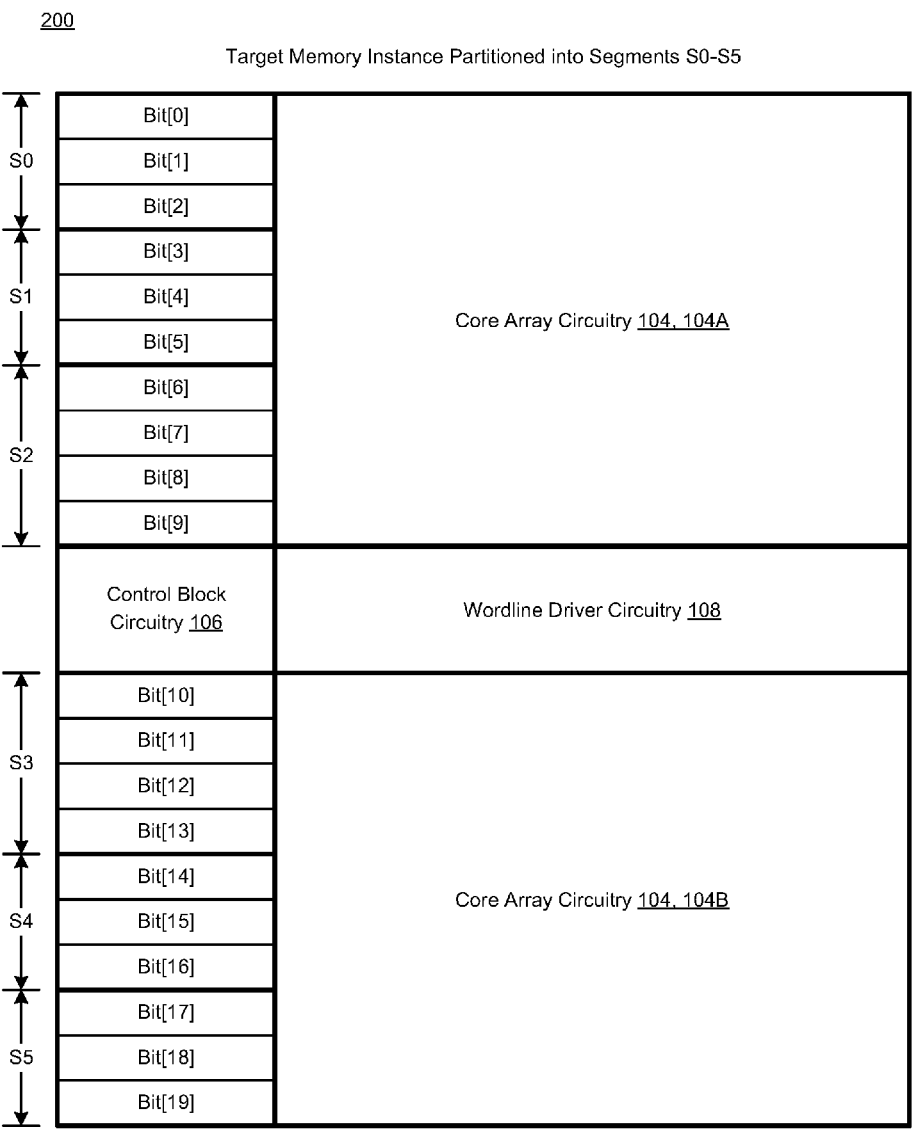
FIG. 2 illustrates a diagram of a target memory instance partitioned into multiple segments in accordance with implementations described herein.

FIG. 2 illustrates a diagram of a target memory instance 200 that is partitioned into multiple segments in accordance with various implementations described herein.

As shown in FIG. 2, the target memory instance 200 includes core circuitry 104 having multiple bitcell arrays, including a first bitcell array 104A and a second bitcell array 104B. Each bitcell array 104A, 104B may include multiple bitcells, and each bitcell may be referred to as a memory cell, and each bitcell may be configured to store at least one data bit value (e.g., a data value related to a logical '0' or '1'). As shown, each bitcell array 104A, 104B may include any number of bitcells arranged in various configurations, such as, e.g., a two-dimensional (2D) memory array having any number of columns and any number of rows of multiple bitcells, which may be arranged in a 2D grid pattern with 2D indexing capabilities. Each bitcell may be implemented with random access memory (RAM) circuitry, and/or some other type of volatile type memory. For instance, each bitcell may include a multi-transistor static RAM (SRAM) cell, including various types of SRAM cells, such as, e.g., 6T CMOS SRAM and/or other types of complementary MOS (CMOS) SRAM cells, such as, e.g., 4T, 8T, 10T, or more transistors per bit. In some instances, the memory circuitry 100 may operate at a source voltage level VDD with a voltage range that varies with technology.

The target memory instance 200 may include control block circuitry 106 that operates as wordline (WL) row decoder circuitry (ROWDEC) for accessing the bitcells via a selected wordline (WL) that is driven by wordline driver circuitry 108. The combination of WL decoder and WL driver may be referred to as (WDX). The target memory instance 200 (including the core circuitry 104, bitcells, and the control 106) may operate at a first supply voltage, such as, e.g., a core supply voltage VDDC. The voltage range varies with technology. In other instances, the row decoder may operate at the core supply voltage VDDC, and other components, such as, e.g., the WL driver may generate a wordline (WL) signal at a second supply voltage that may be different than the first or core supply voltage VDDC, such as, e.g., a periphery supply voltage VDDP.

In various implementations, the target memory instance 200 may be partitioned (or divided) into a number (N) of segments, such as, e.g., S0, S1, S2, S3, S4, S5, with each segment having a number (M) of bits. As shown in FIG. 2, the number of (N) of segments may be six (6). For instance, in reference to the first core array circuitry 104A, a first segment S0 may include multiple bits (Bit[0], Bit[1], Bit[2]), a second segment S1 may include multiple bits (Bit[3], Bit[4], Bit[5]), and a third segment S2 may include multiple bits (Bit[6], Bit[7], Bit[8], Bit[9]). Also, in reference to the second core array circuitry 104B, a fourth segment S3 may include multiple bits (Bit[10], Bit[11], Bit[12], Bit[13]), a fifth segment S4 may include multiple bits (Bit[14], Bit[15], Bit[16]), and a sixth segment S5 may include multiple bits (Bit[17], Bit[18], Bit[19]).

In accordance with various implementations described herein, the number (N) of segments may be determined using an algorithm that is based on a specified user-defined accuracy (e.g., in pico-seconds (pS)) and/or an internal RC delay obtained from extracted netlist. For instance, the following algorithm may be used.

(#-of-bits/segments)*$R$*$C$*0.8 measurement
Threshold=accuracy in pS

Example: R=1 Kohm, and C=2.5 fF
measurement Threshold=0.8 for 80%
Accuracy in pS=10 pS
Then, (#-of-bits/segments)=10p/(1K*2.5f*0.8)=5

In some instances, segment based timing may be reported by splitting bus into flexible sub-bus, where in timing accuracy may be determined (or calculated) as follows.

In a first event, access time (tacc) pessimism may be reduced to tacc<up to 2% (e.g., depending on the number of bits (M) in the segment).

In a second event, data bus setup and hold time pessimism may be reduced for up to <5 ps (in benchmarking corners), which may be dependent only on the number (M) of bits in the segment.

In a third event, liberty file size may be determined (e.g., a memory instance liberty file size=129 MB). In some instances, each of the input/output bus timing data is a large portion of the overall liberty file size. Sometimes, bit-blasting the input/output bus for each bit that reports a different timing may increase liberty file size.

In a fourth event, simulation runtime may be determined to enable a memory compiler, wherein a same number of compiler instances may be characterized with the segments based timing, and the segment based interpolation may enable the memory compiler instances.

Advantageously, the schemes and techniques described herein may be used to achieve high timing model accuracy without dramatically increasing the complexity and cost for development and verification for memory compilers.

Figure 3:
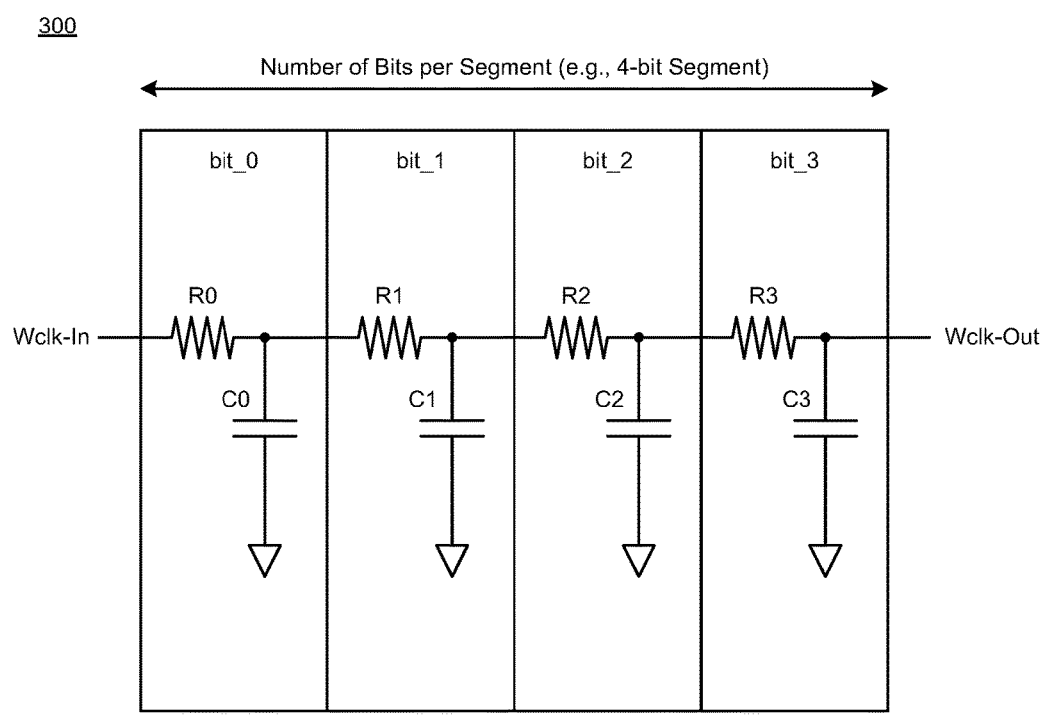
FIG. 3 illustrates a diagram of a segment having a specified number of bits per segment in accordance with implementations described herein.

FIG. 3 illustrates a diagram of a segment 300 having a specified number of bits per segment in accordance with various implementations described herein.

As shown in FIG. 3, the segment 300 may include a 4-bit segment having a number of bits (4), such as, e.g., bit_0, bit_1, bit_2, bit_3, wherein each bit may have an effective RC associated therewith. For instance, a first bit (bit_0) may have a first effective RC associated with a first resistor (R0) and a first capacitor (C0), and a second bit (bit_1) may have a second effective RC associated with a second resistor (R1) and a second capacitor (C1). Further, a third bit (bit_2) may have a third effective RC associated with a third resistor (R2) and a third capacitor (C2), and a fourth bit (bit_3) may have a fourth effective RC associated with a fourth resistor (R3) and a fourth capacitor (C3). In some instances, the bits (bit_0, bit_1, bit_2, bit_3) may be arranged in series to receive a write clock input (Wclk-in) and provide a write clock output (Wclk-out).

The segment 300 is implemented as a 4-bit segment. However, in various other implementations, the segment may have any number of bits (e.g., 2 or 3) depending on specific applications of the various schemes and techniques describe herein.

Figure 4:
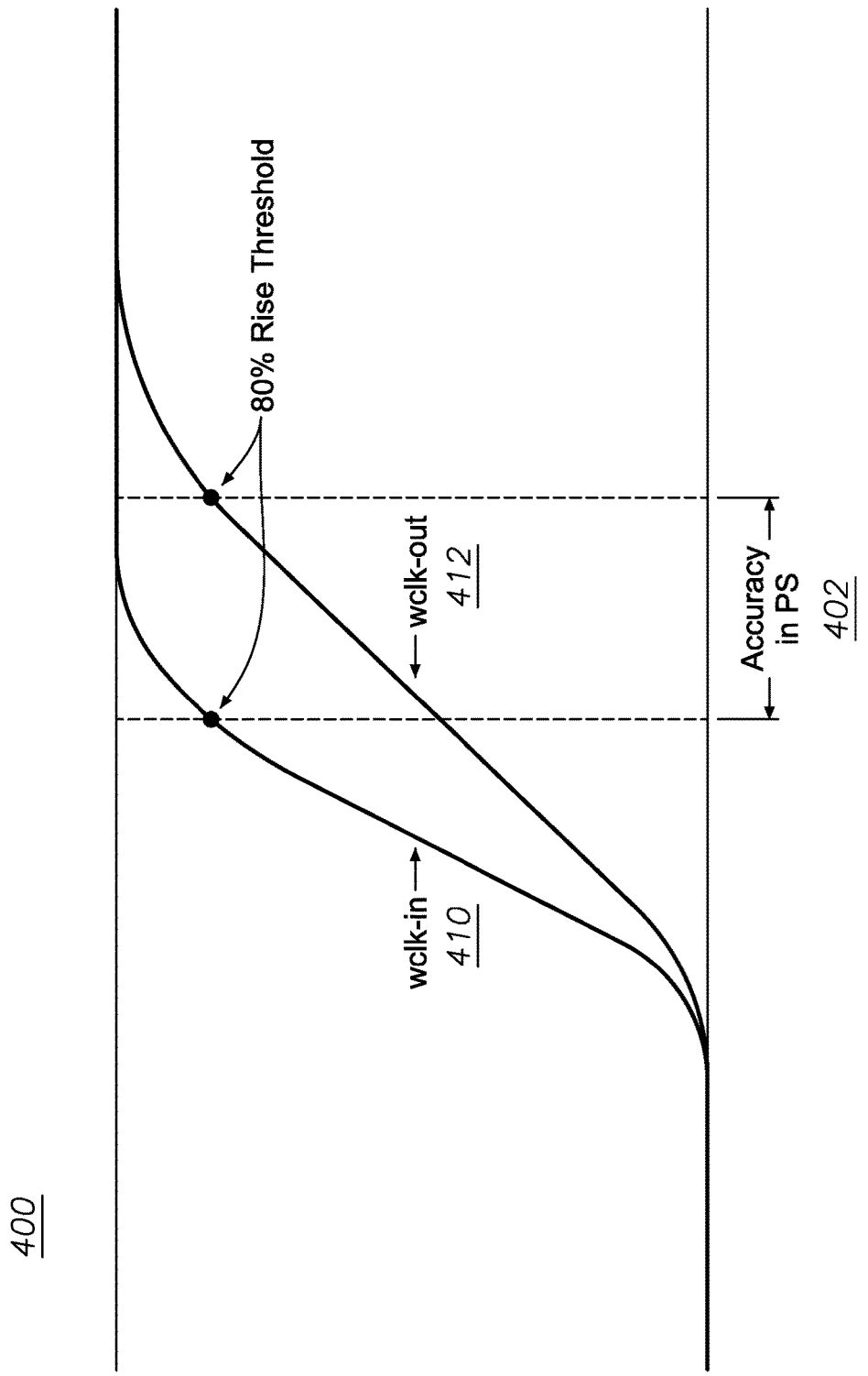
FIG. 4 illustrates a waveform diagram of user defined accuracy when applied to a segmented memory instance in accordance with implementations described herein.

FIG. 4 illustrates a waveform diagram 400 of user defined accuracy 402 when applied to a segmented memory instance in accordance with various implementations described herein. For instance, as shown in FIG. 4, and in reference to FIG. 3, a first waveform 410 of the write clock input (Wclk-in) and a second waveform 412 of the write clock output (Wclk-out) is graphically displayed in the waveform diagram 400.

In some implementations, the user defined accuracy 402 may refer to a rise in threshold, such as, e.g., approximately 80% rise in threshold. Sometimes, the waveform diagram 400 may be used to determine segment timing accuracy that may be dependent on a maximum number of bits in a segment.

Various implementations of methods and methodologies for generating timing files, such as liberty timing files, will now be described in reference to FIGS. 5-6.

Figure 5:
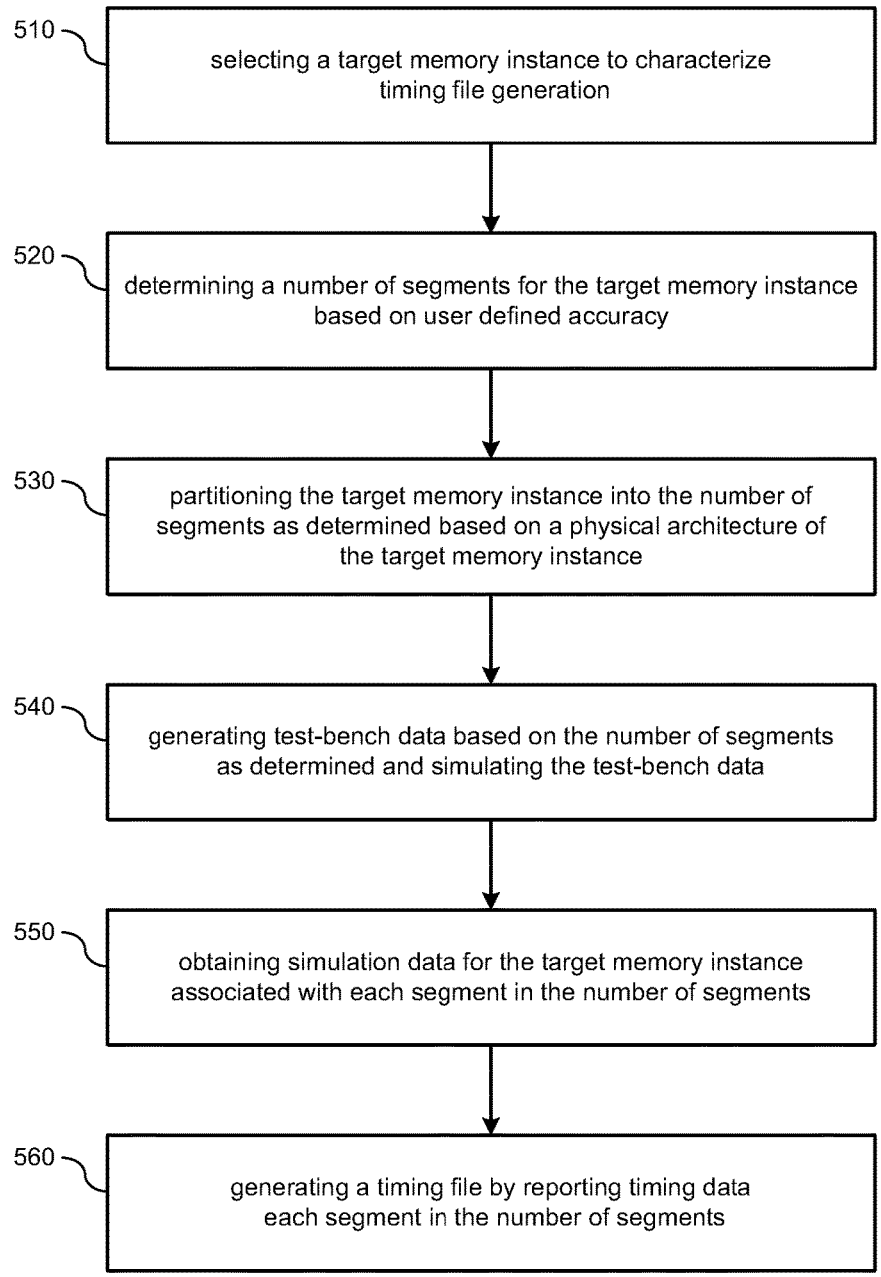
FIGS. 5-6 illustrate diagrams of various methods for generating liberty timing files in accordance with various implementations described herein.

FIG. 5 illustrates a diagram of a method 500 for generating timing files (e.g., liberty timing files) in accordance with various implementations described herein.

It should be understood that while method 500 indicates a particular order of execution of operations, in some instances, certain portions of the operations may be executed in a different order, and on different systems. Further, in some instances, the computing device 100 of FIG. 1 may be configured to perform method 500. In other instances, additional operations or steps may be added to method 500. Similarly, some operations or steps may be omitted.

In some implementations, method 500 may be implemented as a program or software instruction process configured for generating liberty files (.lib files). For instance, method 500 may be configured to provide the following sequence of events.

At block 510, method 500 may select a target memory instance to characterize for timing file generation. The target memory instance may include a memory input bus width and a memory output bus width that are dependent on a size of the target memory instance. At block 520, method 500 may determine (or calculate) a number of segments for the target memory instance based on user defined accuracy. The number of segments may be determined for the memory input bus width and the memory output bus width based on the user defined accuracy using a bits-per-segment calculation algorithm. The user defined accuracy may be determined by direct user input of a selected target number of segments for the target memory instance.

At block 530, method 500 may partition (or divide) the target memory instance into the number of segments based on a physical architecture of the target memory instance. At block 540, method 500 may generate test-bench data based on the number of segments and simulating the test-bench data. In some instances, the test-bench data may have netlist data for simulation, and the test-bench data may be simulated with the netlist data. At block 550, method 500 may obtain (or collect) simulation data for the target memory instance associated with each segment in the number of segments. In some instances, the simulation data may be obtained for a memory input setup and hold time for each segment in the number of segments. In other instances, the simulation data may be obtained for an output delay from a rise of an input clock for each segment in the number of segments. At block 560, method 500 may generate a timing file by reporting timing data for each segment in the number of segments. In some instances, the timing file may be generated by reporting worst case timing data for each segment in the number of segments. Further, in some implementations, method 600 may also include manufacturing, or causing to be manufactured, an integrated circuit based on the timing file.

Figure 6:
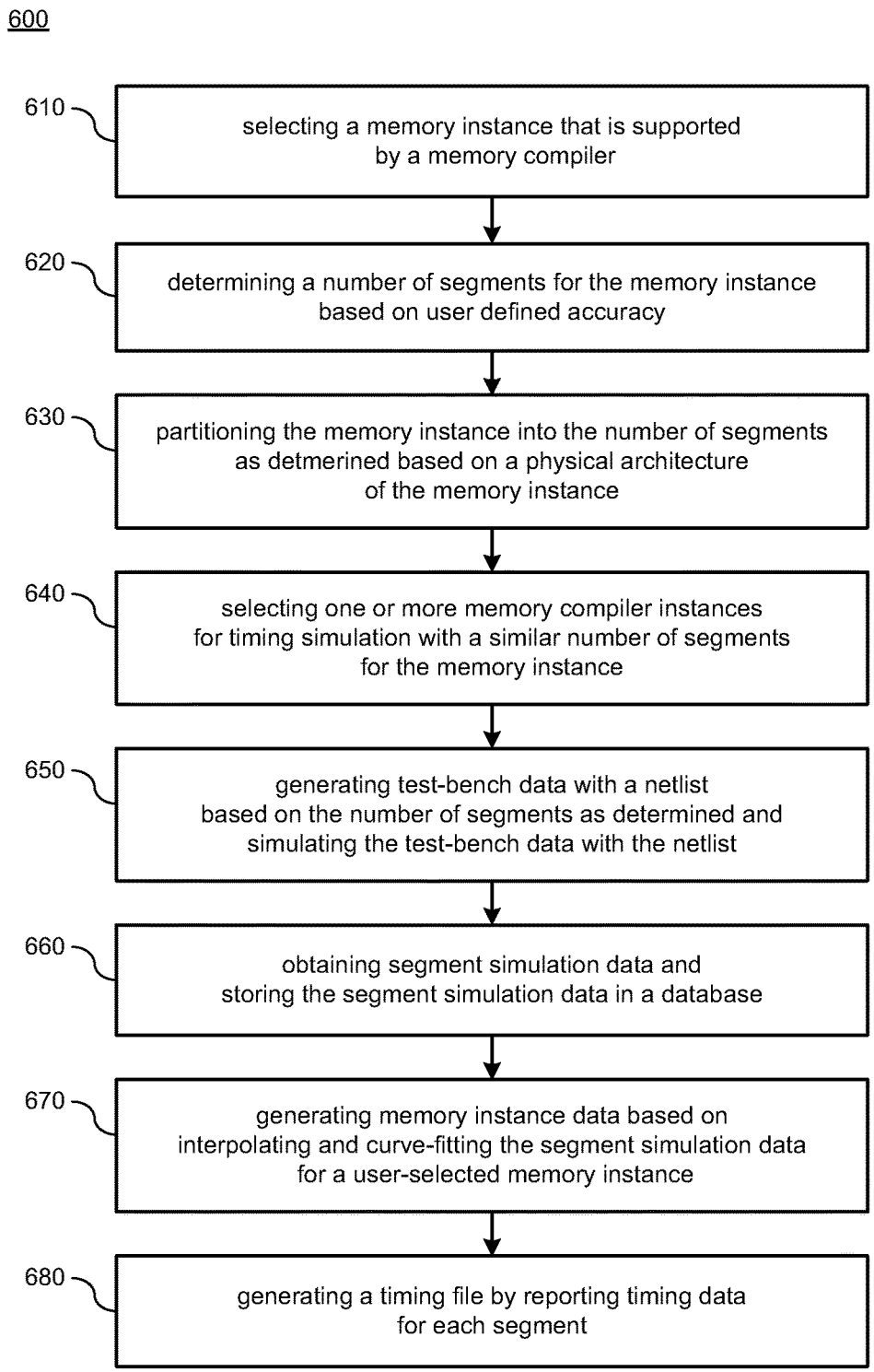

FIG. 6 illustrates a diagram of a method 600 for generating timing files (e.g., liberty timing files) in accordance with various implementations described herein.

It should be understood that while method 600 indicates a particular order of execution of operations, in some instances, certain portions of the operations may be executed in a different order, and on different systems. Further, in some instances, the computing device 100 of FIG. 1 may be configured to perform method 600. In other instances, additional operations or steps may be added to method 600. Similarly, some operations or steps may be omitted.

In some implementations, method 600 may be implemented as a program or software instruction process configured for generating liberty files (.lib files). For instance, method 600 may be configured to provide the following sequence of events.

At block 610, method 600 may select a memory instance that is supported by a memory compiler (e.g., memory compiler 120 in FIG. 1). The memory instance may be implemented with a widest memory instance. The memory instance may include a memory input bus width and a memory output bus width that are dependent on a size of the memory instance. At block 620, method 600 may determine (or calculate) a number of segments for the memory instance based on user defined accuracy. The user defined accuracy may be determined by direct user input of a selected target number of segments for the target memory instance. The number of segments may be determined for the memory input bus width and the memory output bus width based on the user defined accuracy using a bits-per-segment calculation algorithm. The number of segments may be fixed for the memory compiler once the number of segments is determined.

At block 630, method 600 may partition (or divide) the memory instance into the number of segments based on a physical architecture of the memory instance. At block 640, method 600 may select one or more memory compiler instances for timing simulation with a similar number of segments for the memory instance. In some instances, the one or more memory compiler instances may be selected for timing simulation with a similar number of segments as the memory input bus and the memory output bus. In other instances, the one or more memory compiler instances that are greater than a size of the number of segments have similar measurement data, and a number of bits-per-segment varies based on a size of the memory instance. At block 650, method 600 may generate test-bench data with a netlist based on the number of segments and simulating the test-bench data with the netlist. At block 660, method 600 may obtain (or collect) segment simulation data and store the segment simulation data in a database.

At block 670, method 600 may generate memory instance data based on interpolating and curve-fitting the segment simulation data for a user-selected memory instance. The memory instance data may be generated based on interpolating and curve-fitting the segment simulation data for a user-selected memory instance when a user selects the memory instance from a memory compiler user-interface. In some instances, memory input bus timing data and memory output bus timing data may be generated for each segment in the number of segments, and the interpolation or the curve-fitting may be used to generate the memory instance data within each segment in the number of segments. At block 680, method 600 may generate a timing file (e.g., a liberty timing file) by reporting timing data for each segment. Further, in some instances, method 600 may also include manufacturing, or causing to be manufactured, an integrated circuit based on the timing file (e.g., the liberty timing file).

Described herein are various implementations of a method. The method may include selecting a target memory instance to characterize for timing file generation, determining a number of segments for the target memory instance based on user defined accuracy, and partitioning the target memory instance into the number of segments based on a physical architecture of the target memory instance. The method may also include generating test-bench data based on the number of segments and simulating the test-bench data, obtaining simulation data for the target memory instance associated with each segment in the number of segments, and generating a timing file by reporting timing data for each segment in the number of segments.

Described herein are various implementations of a method. The method may include selecting a memory instance that is supported by a memory compiler, determining a number of segments for the memory instance based on user defined accuracy, and partitioning the memory instance into the number of segments based on a physical architecture of the memory instance. The method may include selecting one or more memory compiler instances for timing simulation with a similar number of segments for the memory instance, generating test-bench data with a netlist based on the number of segments and simulating the test-bench data with the netlist, and obtaining segment simulation data and storing the segment simulation data in a database. The method may include generating memory instance data based on interpolating and curve-fitting the segment simulation data for a user-selected memory instance and generating a timing file by reporting timing data for each segment.

Described herein are various implementations of a device with a processor and a storage component having stored thereon instructions that, when executed by the processor, cause the processor to select a memory instance to characterize for timing file generation. The memory instance may include a memory input and output bus width that is dependent on a size of the memory instance. The instructions may cause the processor to determine a number of segments for the memory input and output bus width based on user defined accuracy, partition the memory input and output bus width into the number of segments as determined based on a physical architecture of the memory instance, and generate test-bench data with a netlist based on the number of segments as determined and simulating the test-bench data with the netlist. The instructions may also cause the processor to obtain simulation data for the memory input and output bus width that is associated with each segment in the number of segments and generate a timing file by reporting timing data for each segment in the number of segments.

Implementations of various technologies described herein may be operational with numerous general purpose or special purpose computing system environments or configurations. Examples of computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smart phones, tablets, wearable computers, cloud computing systems, virtual computers, marine electronics devices, and the like.

The various technologies described herein may be implemented in the general context of computer-executable instructions, such as program modules, being executed by a computer. Program modules include routines, programs, objects, components, data structures, etc. that perform particular tasks or implement particular abstract data types. Further, each program module may be implemented in its own way, and all need not be implemented the same way. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or some combination of both.

The various technologies described herein may be implemented in distributed computing environments where tasks are performed by remote processing devices that are linked through a communications network, e.g., by hardwired links, wireless links, or various combinations thereof. In a distributed computing environment, program modules may be located in both local and remote computer storage media including, for example, memory storage devices and similar.

Further, the discussion provided herein may be considered directed to certain specific implementations. It should be understood that the discussion provided herein is provided for the purpose of enabling a person with ordinary skill in the art to make and use any subject matter defined herein by the subject matter of the claims.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    selecting a target memory instance to characterize for timing file generation;
    determining a number of segments for the target memory instance based on user defined accuracy;
    partitioning the target memory instance into the number of segments based on a physical architecture of the target memory instance;
    generating test-bench data based on the number of segments and simulating the test-bench data;
    obtaining simulation data for the target memory instance associated with each segment in the number of segments; and
    generating a timing file by reporting timing data for each segment in the number of segments.

2. The method of claim 1, wherein the target memory instance comprises a memory input bus width and a memory output bus width that are dependent on a size of the target memory instance.

3. The method of claim 2, wherein the number of segments is determined for the memory input bus width and the memory output bus width based on the user defined accuracy using a bits-per-segment calculation algorithm.

4. The method of claim 1, wherein the user defined accuracy is determined by direct user input of a selected target number of segments for the target memory instance.

5. The method of claim 1, wherein the simulation data is obtained for a memory input setup and hold time for each segment in the number of segments.

6. The method of claim 1, wherein the simulation data is obtained for an output delay from a rise of an input clock for each segment in the number of segments.

7. The method of claim 1, wherein the timing file is generated by reporting worst case timing data for each segment in the number of segments.

8. The method of claim 1, wherein the test-bench data has netlist data for simulation, and wherein the test-bench data is simulated with the netlist data.

9. A method, comprising:
    selecting a memory instance that is supported by a memory compiler;
    determining a number of segments for the memory instance based on user defined accuracy;
    partitioning the memory instance into the number of segments based on a physical architecture of the memory instance;
    selecting one or more memory compiler instances for timing simulation with a similar number of segments for the memory instance;
    generating test-bench data with a netlist based on the number of segments and simulating the test-bench data with the netlist;
    obtaining segment simulation data and storing the segment simulation data in a database;

generating memory instance data based on interpolating and curve-fitting the segment simulation data for a user-selected memory instance; and generating a timing file by reporting timing data for each segment.

10. The method of claim 9, wherein the memory instance comprises a widest memory instance.

11. The method of claim 9, wherein the memory instance comprises a memory input bus width and a memory output bus width that are dependent on a size of the memory instance.

12. The method of claim 11, wherein the number of segments is determined for the memory input bus width and the memory output bus width based on the user defined accuracy using a bits-per-segment calculation algorithm.

13. The method of claim 11, wherein the one or more memory compiler instances are selected for timing simulation with a similar number of segments as the memory input bus and the memory output bus.

14. The method of claim 9, wherein the number of segments is fixed for the memory compiler once the number of segments is determined.

15. The method of claim 9, wherein the one or more memory compiler instances that are greater than a size of the number of segments have similar measurement data, and wherein a number of bits-per-segment varies based on a size of the memory instance.

16. The method of claim 9, wherein the user defined accuracy is determined by direct user input of a selected target number of segments for the target memory instance.

17. The method of claim 9, wherein the memory instance data is generated based on interpolating and curve-fitting the segment simulation data for a user-selected memory instance when a user selects the memory instance from a memory compiler user-interface.

18. The method of claim 17, wherein memory input bus timing data and memory output bus timing data are generated for each segment in the number of segments, and wherein the interpolation or the curve-fitting is used to generate the memory instance data within each segment in the number of segments.

19. A device, comprising:
a processor; and
a storage component having stored thereon instructions that, when executed by the processor, cause the processor to:
select a memory instance to characterize for timing file generation, wherein the memory instance comprises a memory input and output bus width that is dependent on a size of the memory instance;
determine a number of segments for the memory input and output bus width based on user defined accuracy;
partition the memory input and output bus width into the number of segments as determined based on a physical architecture of the memory instance;
generate test-bench data with a netlist based on the number of segments as determined and simulating the test-bench data with the netlist;
obtain simulation data for the memory input and output bus width that is associated with each segment in the number of segments; and
generate a timing file by reporting timing data for each segment in the number of segments.

20. The device of claim 19, wherein the instructions may further cause the processor to manufacture, or cause to be manufactured, an integrated circuit based on the timing file.

\* \* \* \* \*